April 30, 1957 I. BADY 2,790,898

WEAK SIGNAL DETECTOR USING SYNCHRONOUSLY SWITCHED RECTIFIER BRIDGE

Filed May 4, 1953

INVENTOR.
ISIDORE BADY
BY Harry M. Saragovitz
ATTORNEY 2,790,898

WEAK SIGNAL DETECTOR USING SYNCHRONOUSLY SWITCHED RECTIFIER BRIDGE

Isidore Bady, Ocean Township, Monmouth County, N. J.

Application May 4, 1953, Serial No. 353,022

3 Claims. (Cl. 250—20)

Figure 1:
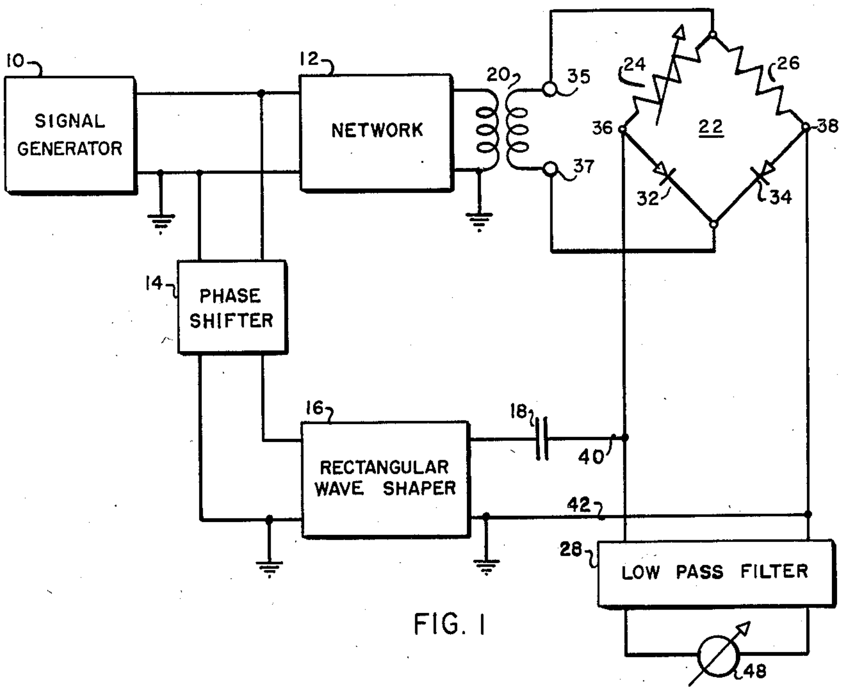

(Granted under Title 35, U. S. Code (1952), sec. 266)

The invention described herein may be manufactured and used by or for the Government for governmental purposes, without the payment of any royalty thereon.

This invention relates to a noise eliminating device and particularly to a circuit for improving signal to noise ratio. More particularly the invention relates to a bridge circuit for improving the signal to noise ratio and detecting a signal, in which the wave form is repeated at a constant rate, which may include sine waves, square waves, pulses, etc.

Standard ways of improving the signal to noise ratio include the use of bandpass filters or ringing circuits. These are limited in the amount of noise they can reject since the pass band cannot be reduced to a value equivalent to that obtainable with applicant's circuit.

Some circuits, such as seen in patent to Earp, No. 2,471,418, are similar to applicant's, but these are not true bridge systems in which the signal is applied across a pair of opposite junctions of the bridge arms, nor do they provide means for balancing the system so that the output of the generator (rectangular wave shaper), that causes the diodes to alternate between the forward and reverse region, does not affect the final output indication when components that should be matched, such as the diodes or resistors are not actually identical. Also in such systems, the signal contributes to the final output indication only during the time that the diodes in the system are in the forward region or only during the time that the diodes in the system are in the reverse region, but not all the time.

It is therefore an object of this invention to provide a circuit for improving signal to noise ratio.

It is a further object of this invention to provide a bridge circuit capable of reducing noise interference in a received radio frequency signal.

It is a further object of this invention to provide a circuit for improving signal to noise ratio utilizing full wave information and with extremely high noise rejection characteristics.

Figure 2:
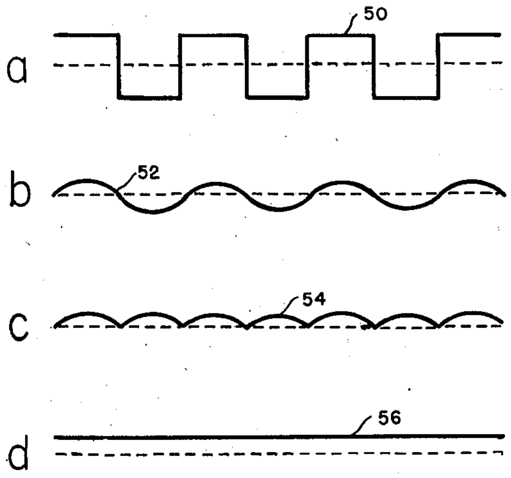

Other and further objects of this invention will become apparent from the following description and the drawing in which:

Figure 1 shows a preferred embodiment of this invention in block diagram form; and Figure 2 shows wave forms illustrating the operation of this invention.

Referring now to Figure 1, the signal generator 10 generates a signal in which the waveform is repeated at a constant frequency. This waveform may be a sine wave, a square wave, a pulse, etc. Block 12 is a network, or equipment, or system which operates on the output of the signal generator or is operated on by the output of the signal generator. The output of 12 contains the waveform that was present in the input, generally greatly attenuated, and possibly very distorted. However, the recurrence frequency remains unchanged. In the cases where the invention will have its maximum application, the noise level at the output of 12 will be comparable to and possibly greater than the level of the desired signal of the constant recurrence frequency.

Part of the output of 10 is also connected to the phase shifter 14. Rectangular wave shaper 16 shapes the output of 14 so that it becomes a rectangular wave with steep sides. The recurrence frequency is unchanged and the output of 16 crosses the zero voltage axis at the same phase angle as the output of 14. It is assumed that the shaper 16 is designed in such a way that its output has no direct current component, i. e., the average voltage (measured across a linear impedance) is zero. The purpose of the capacitor 18 is to provide a low impedance path for the alternating current output of 16, but a very high impedance for any direct current. The purpose of transformer 20 is to isolate the ground potential of 12 from the ground potential of 16.

The most important features of this invention are contained in 22, which is a bridge circuit of novel design. Two of the arms of the bridge consist of conventional resistors 24 and 26, one of which, for example 24, is variable for reasons that will be apparent later. The other two arms of the bridge are diodes 32 and 34 which may be arranged so that the two anodes are connected to a common junction of the bridge. It would be equally satisfactory if both diodes were reversed so that both cathodes were connected to a common junction. The diodes may be vacuum tube diodes or crystal diodes. The resistors 24 and 26 should be chosen so that they are considerably greater than the forward resistance of the diodes, and considerably smaller than the inverse resistance of the diodes.

In order to discuss the manner in which the bridge 22 operates, let us first consider that network 12 is removed and replaced by a sine wave generator. At the same time, the connections between 12 and 10 and between 12 and 14 are removed so that the sine wave generator is directly connected to transformer 20.

Let us further consider that the sine wave generator is not producing any output. Blocks 10, 14 and 16 are however operating, and block 16 is producing a signal with a rectangular waveform of recurrence frequency F. The effect of this rectangular waveform is to cause one of the diodes to be in the forward region and the other in the reverse region. When the polarity of the output of 16 is positive with respect to ground, diode 32 is in the forward region and diode 34 is in the reverse region. The converse is true when the output of 16 is negative with respect to ground. The positive and negative amplitudes of the output of 16 are each assumed to have been made large enough so that whichever of the diodes is in the reverse region, for the particular polarity of 16, is carried well into the reverse region, far removed from the transition between forward and reverse characteristics. Conversely, a diode in the forward region is carried well into the forward region. Since the output of block 16 is alternately positive and negative, the region each diode is in will alternate accordingly.

Considering the current paths when the output of the rectangular wave shaper 16 is positive with respect to ground, current will flow from the positive side of the output of 16, and through capacitor 18 which has been made large enough to offer negligible impedance. At junction 36 of the bridge 22, the current will divide into two paths. One path will go through resistors 24 and 26 back to ground, and the second path will go through diode 32, which is in the forward region, and then through transformer 20 and resistor 26 to ground. A small amount of the current that passes through diode 32 will pass through diode 34, which is in the reverse region, to ground. When the output of 16 is negative with respect to ground, the current will follow a similar path, but with the functions 32 and 34, and the functions of 24 and 26, reversed. If 24 and 26 are equal, and the characteristics of diodes 32 and 34 the same, since the average voltage generated by 16 has been assumed to have an average value of zero, considerations of symmetry show that the average current will be zero and no direct voltage will be developed across the capacitor 18 or across the input to the low pass filter 28.

Generally, diodes 32 and 34 will not have exactly the same characteristics. However, by making the resistor 24 variable, it will be possible to balance the bridge 22 so that no direct current appears across the input to the low pass filter 28 due to the output of the square wave shaper 16.

Now let us consider that the sine wave generator in place of network 12 is turned on and let the output, as it appears across the secondary 35—37 of transformer 20 be $V_g \sin 2\pi ft$. It is assumed that the amplitude $V_g$ has been adjusted so as to be always smaller than either the positive or negative amplitude of the rectangular wave shaper 16. In this manner the output of the sine wave generator will have no effect as to the region, forward or reverse, in which the diodes are operating. For convenience, let us assume that the resistance of each of the diodes is zero when it is in the forward region and infinite when it is in the reverse region. This assumption will result in considerable simplification of the discussion without in any way invalidating the argument. Also, for convenience, let us consider that the output $V_d$, of the rectangular wave shaper block 16, can be represented by the following expressions:

$$V_d = V_1 \text{ for } o \leqslant t < T_a$$
$$V_d = -V_2 \text{ for } T_a \leqslant t < T$$
$$V_d = V_1 \text{ for } T \leqslant t < T + T_a$$
$$V_d = -V_2 \text{ for } T + T_a \leqslant t < 2T$$

etc.

($T = 1/F$: $V_1$ and $V_2$ are positive numbers)

Examination of the circuit in Figure 1, and consideration of the assumptions in the above paragraphs will show that the bridge output, point 36 with reference to point 38, due to $V_g \sin 2\pi ft$ will be as follows:

$$-V_g \sin 2\pi ft \text{ for } o \leqslant t < T_a$$
$$V_g \sin 2\pi ft \text{ for } T_a \leqslant t < T$$
$$-V_g \sin 2\pi ft \text{ for } T \leqslant t < T + T_a$$
$$V_g \sin 2\pi ft \text{ for } T + T_a \leqslant t < 2T$$

etc.

One skilled in the art will recognize that the bridge output due to $V_g \sin 2\pi ft$ can be written as follows:

$$\left(\sum_1^\infty An \sin 2\pi nFt + \sum_0^\infty Bn \cos 2\pi nFt\right) V_g \sin 2\pi ft$$

The values of the coefficients $An$ and $Bn$ will depend on the shape of the recurrent waveform.

The average output of the bridge due to $V_g \sin 2\pi ft$ is equal to $$\frac{\int_0^t \left[\left(\sum_1^\infty An \sin 2\pi nFt + \sum_0^\infty Bn \cos 2\pi nFt\right) V_g \sin 2\pi ft\right] dt}{t}$$

From a Fourier series type of analysis, it is well known that the average value of the above expression approaches zero for all values of frequency $f$ which are not exactly equal to frequency F or an harmonic of F. That is, the direct current component of the bridge output, as it appears across points 36—38 and the input to the low pass filter 28, due to $V_g \sin 2\pi ft$ will be zero, unless the frequency $f$ is exactly equal to frequency F or an harmonic of F. Since we have previously stated that the bridge has been adjusted, by varying 24, so that the output of the rectangular wave shaper 16 causes no direct current voltage to appear across the input to the low pass filter 28, it follows that when frequency $f$ is not exactly equal to frequency F or an harmonic of F, there will be no direct current component of voltage across the input to the low pass filter from any source. The direct current meter 48, which is connected to the output of the filter, will thus indicate zero. Meter 48 is a sensitive galvanometer or a direct current amplifier with a direct current output meter. The purpose of the low pass filter is to pass direct current voltages and attenuate all alternating current voltages. One reason for attenuating alternating current voltages is to prevent them from overloading or damaging the meter. In particular the output of 16 may overload or damage meter 48 if not greatly attenuated.

When frequency $f$ is exactly equal to frequency F or an harmonic of F a direct current voltage will appear across the input to the low pass filter, and the meter will indicate other than zero. The amplitude of the meter indication will depend in part on the phase relation between the output of 16 and the output of the sine wave generator as it appears across the secondary 35—37 of the transformer 20, and it may be zero. It is the function of the phase shifter 14 to adjust the relative phase of the two voltages so that the meter gives a maximum indication.

It has been noted above that when the frequency $f$ is not exactly equal to F or a harmonic of F, no direct current will appear at the input to the low pass filter. However, alternating current will appear. If this alternating current gets to the meter, and if it is low enough in frequency, it will cause the meter to oscillate back and forth. The meter behaves in effect like a low pass filter. It passes direct current and relatively low frequencies and attenuates relatively high frequencies. The time constant of the meter determines its frequency response. The oscillations of the meter due to the alternating current will tend to mask or obscure the presence of a direct current and so cause errors. Hence, it should be attenuated as much as possible before getting to the meter. One function of the low pass filter is therefore to attenuate alternating current so as to prevent the meter 48 from oscillating.

It is apparent from the above that the bridge 22, in conjunction with the law pass filter 28, behaves like a filter which has a series of pass bands centered at frequencies F and its harmonics. These pass bands can be made as narrow as desired by increasing the time constant of the low pass filter. It should be noted that a conventional filter with a conventional pass band centered at F can be placed between the output of the low pass filter and the input of the meter 48. The combination of the bridge 22, the low pass filter 28, and the conventional filter will be in effect a filter with a single very narrow pass band. There is no limit as to how narrow the pass band can be made. With a suitable design of low pass filter 28, pass bands of .001 cycle per second and narrower, are readily obtained.

An example of how the invention works when $f = F$ is shown in Figure 2, in which curve 50 of 2*a* represents the output of the rectangular wave shaper 16, curve 52 of 2*b* represents an output of network 12. The resultant voltage across terminals 36—38 of bridge 22, due to the output of network 12, is shown in curve 54 of 2*c* with the resultant output across meter 48 shown in the filtered direct current component 56 of 2*d*. It should be noted that the sine wave signal contributes to the output when the diodes are in the forward region and also when they are in the reverse region.

Referring back to Figure 1, it was noted previously that the output of 12 will contain the desired signal waveform which has a recurrence frequency of F. In the cases where the invention will have its maximum utility, the output of 12 will contain a large amount of noise that will to a more or less degree obscure the desired signal.

Since the bridge 22 in conjunction with the low pass filter 28 operates as a filter with extremely narrow pass bands, the noise will be very greatly attenuated. However, the circuit will not attenuate the desired signal, since the recurrence frequency of the desired signal and the recurrence frequency of the output of the rectangular wave shaper, block 16, are exactly the same. Hence, the invention has greatly improved the signal to noise ratio in detecting the desired signal.

While 12 has been shown here as a network, or, for purpose of detailed analysis, as a sine wave generator, it is obvious that network 12 may also represent an attenuator. Block 23 may also represent a complete system containing a radar transmitter whose carrier is modulated by the output of the signal generator, 10. The modulated signal from the transmitter is reflected back by an obstacle such as an airplane it is desired to detect, and is picked up by a receiver included in the system. The receiver amplifies the reflected signal and finally demodulates it. The output of the receiver contains the demodulated signal plus noise which may partially mask the desired signal. In going through the above system, the waveform that is generated in block 10 may be badly distorted by the time it emerges in the output of block 12, but the recurrence frequency F remains unchanged, and the remainder of the circuit will function as described earlier.

Preferred embodiments of the invention have been described in slightly simplified form to facilitate an understanding of the features of the invention, but many variations will be apparent to those skilled in the art.

What is claimed is:

1. A detecting means for signals having a constant repetition rate comprising: means for generating local signals at said constant repetition rate, means for converting the output of said local signal generating means into square waves at said constant repetition rate, a bridge detecting means comprising a first two terminals and a second two terminals, a first resistor connected between one of said first two terminals and one of said second two terminals, a second resistor connected between said one of said second two terminals and the other of said first two terminals, a first rectifier having its positive pole connected to said one of said first two terminals and its negative pole connected to the other of said second two terminals, a second rectifier having its negative pole connected to said other of said second two terminals and its positive pole connected to said other of said first two terminals, means for applying said square wave across said first two terminals, means for applying said signal across said second two terminals, and means for detecting the direct-current component of the output across said first two terminals, said square waves being of sufficient amplitude to drive one of said rectifiers well into the conducting region while the other is driven well into the cut-off region.

2. A system as in claim 1 having a low-pass filter connected between the output across said first two terminals and said means for detecting the direct-current component.

3. In a system as in claim 1, a phase-shifting means connecting said means for generating a local signal to said square wave converting means to adjust the phase of said square waves to coincide with the signals having a constant repetition rate.

References Cited in the file of this patent

UNITED STATES PATENTS

| | | |
|---|---|---|
| 1,447,793 | Latour | Mar. 6, 1923 |
| 1,929,216 | Pfannenmueller | Oct. 3, 1933 |
| 2,258,128 | Black | Oct. 7, 1941 |
| 2,453,078 | Posthumus | Nov. 2, 1948 |
| 2,471,418 | Earp | May 31, 1949 |
| 2,481,562 | Bailey | Sept. 13, 1949 |
| 2,585,532 | Briggs | Feb. 12, 1952 |